(12) United States Patent
Hasse et al.

(10) Patent No.: US 7,526,758 B2
(45) Date of Patent: Apr. 28, 2009

(54) EXECUTION FAILURE INVESTIGATION USING STATIC ANALYSIS

(75) Inventors: Damian Hasse, Redmond, WA (US); Kshitiz K. Sharma, Bellevue, WA (US); Thushara K. Wijeratna, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 707 days.

(21) Appl. No.: 11/171,745

(22) Filed: Jun. 30, 2005

(65) Prior Publication Data
US 2007/0006170 A1 Jan. 4, 2007

(51) Int. Cl.
*G06F 9/44* (2006.01)
(52) U.S. Cl. .................... 717/133; 717/128; 717/130; 717/142; 717/156; 714/38; 714/39
(58) Field of Classification Search ......... 717/131–133, 717/141–144, 146, 154–158; 714/37–39
See application file for complete search history.

(56) References Cited

U.S. PATENT DOCUMENTS

| | | | | |
|---|---|---|---|---|
| 5,854,924 A * | 12/1998 | Rickel et al. | ................ | 717/132 |
| 5,987,626 A * | 11/1999 | Greyzck | ................ | 714/38 |
| 6,205,560 B1 * | 3/2001 | Hervin et al. | ................ | 714/34 |
| 6,353,924 B1 * | 3/2002 | Ayers et al. | ................ | 717/128 |
| 6,393,606 B1 * | 5/2002 | Davila et al. | ................ | 717/127 |
| 7,401,322 B1 * | 7/2008 | Shagam et al. | ................ | 717/128 |
| 7,401,332 B2 * | 7/2008 | Foster et al. | ................ | 717/175 |

OTHER PUBLICATIONS

Cowan et al., "Stack Guard: Automatic Adaptive Detection and Prevention of Buffer-Overflow Attacks", USENIX, 1998.*
Hood et al., "Paralell Program Debugging with On-the-fly Anomaly Detection", I EEE CH2916-5/90/0000/0074, 1990.*
Manevich et al., "PSE: Explaining Program Failures via Postmortem Static Analysis", ACM, 2004.*
Zhou et al., "iWatcher: Efficient Architectural Support for Software Debugging", IEEE, 2004.*
Hood et al., "Paralell Program Debugging with On-the-fly Anomaly Detection", IEEE CH2916-5/90/0000/0074, 1990.*
Allen, F.E. et al., "A Program Data Flow Analysis Procedure", *Communications of the ACM*, 1976, 19(3), 137-147.

* cited by examiner

*Primary Examiner*—Wei Y Zhen
*Assistant Examiner*—Ryan D Coyer
(74) *Attorney, Agent, or Firm*—Woodcock Washburn LLP

(57) ABSTRACT

When, during debugging, a program failure occurs, the location of the failure is determined. First the address in the stack related to the program failure is found. Then static analysis is performed in order to determine a possible culprit for the failure. For example, when a security cookie has been overwritten, indicating a probable overflow, the location of the security cookie on the stack is determined, and proximate storage structures (such as arrays) which may have overflowed onto the location of the security cookie are determined. Then static analysis is used to determine probable sources (e.g. functions or instructions in a function) for this error. In this way, the root cause of a buffer overflow or similar problem can be identified easily, rather than requiring extensive time and knowledge regarding the working of the compiler, the security cookie, the stack, static analysis, and the source code.

10 Claims, 4 Drawing Sheets

EXECUTION FAILURE INVESTIGATION USING STATIC ANALYSIS

BACKGROUND

In order to correct problems in code under development, software developers often use a debugging tool. In order to be effective, a debugging tool provides information which assists a developer in determining where an identified problem has occurred. This allows the developer to correct the problem.

One way in which debugging tools provide information to a user is via an analysis of the thread stack. The thread stack contains a call stack, with data related to the function calls executed during the execution of a program. The thread stack also contains other data like local variables and parameters. The thread stack, used, for example, in the x86 architecture, contains a stack frame for each function call. The stack frame includes information about the function, including, e.g., function parameters, function return address, and locally declared variables and buffers.

When a function is called, information (e.g. a stack frame) regarding the function is pushed onto the thread stack. When the function returns, information is removed from the thread stack and the register trace. The register trace shows the value of registers at the point of the crash. One such register is the EIP, also known as the program counter. Knowing the EIP allows one to look at the machine instruction causing the failure. Since the instruction possibly uses other registers, the value of all registers can be used to determine out the specific nature of the crash. Thus, debugger users use the information in the call stack and information from a register trace performed by the debugger in order to determine where the problem has occurred.

One cause for failure in the execution of a program is a buffer overflow. One of the locally declared variables and buffers in the stack frame may be written with more information than the size of the buffer. This affects the values in other buffers, which causes errors or allows a malicious function to change function data, for example altering the execution path of a program.

Some compilers, for example Microsoft's Visual C++.NET compiler, allow for easier detection of such buffer overrun problems via a "speed bump" or "security cookie". In such compilers, a special "security cookie" value is stored in the call stack in a location which will allow detection of a buffer overrun. If the security cookie has been altered in any way, this indicates that an overrun has happened and that data has been compromised. A compiler may allow the insertion of such cookies in the compiled code via a compile switch. The "/GS" compile switch in Microsoft Corporation's Visual C++.Net is used to indicate that security cookies should be used.

On function entry, the space allocated for the security cookie is loaded with a security cookie that is computed once at module load. Then, on function exit, a helper is called to make sure the cookie's value is still valid. If they are different, then a problem has been detected. The cookie is compared with a stored copy of the cookie to determine validity.

The security cookie is used to determine that a failure has occurred. However, a current limitation of debuggers is in their limited use of static analysis in determining the cause of failures. As discussed above, a register trace and a call stack are generally available to the debugger and a fair amount of information can be collected using merely these. However, the call stack only points out the direct failure path. This may not include the information necessary to determine what function caused the failure.

For example, when a failure occurs, the call stack may contain information regarding two functions, A and B. However, this does not mean that the failure is attributable to one of these two functions. When these two functions appear on the call stack, they have been called and not returned from. However, it is possible that many other functions could have been called and returned from, and the root cause of the failure could likely lie inside a function that is thus not even present in the call stack. Simple examination of the call stack will not yield information regarding functions which have been called and returned from, and thus do not appear on the call stack.

When a security cookie has been corrupted, determining the source of the corruption is important in order to remediate the problem which resulted in the corruption. During a crash, an application reporting tool enables the generation of what is called a "crash dump" containing information about the crash. There are different types of crash dumps and the type of dumps collected and sent depends on how the user has the system configured. Sometimes the address and value of the corrupted security cookie will be available in the crash dump. The address and/or value may not be available if the stack frame is corrupted, for example, which is likely when a buffer overrun occurs. In any case, merely having the address and value of the security cookie does not provide insight into the function which caused the corruption.

Debugging also often requires the source code of the programs. For various reasons, this source code may not always be available. For example, when using a standard library for a function, the source code may not be available for a function, which may complicate debugging.

SUMMARY

In order to determine a cause for the failure of a program, static analysis is used. In some embodiments, to determine the actual location of program-related data in the call stack, such as the cookie, the address for the cookie is obtained, and the program is disassembled to find an instruction that places the program-related data/cookie. In some embodiments, static analysis is used to determine the actual location of the program-related data.

When the location of the program-related data is determined, nearby data structures can be identified. These data structures, then, may be the cause of the program failure, if they have been overflowed. Static analysis is performed to find some part of the program (e.g. a function or a portion of code) which has written to the data structures, and which therefore may have caused the program failure.

The determination of a cause for the failure does not require access to the source code. This allows greater flexibility in determining the cause for the failure of a program where not all source code is available.

Only some embodiments of the invention have been described in this summary. Other embodiments, advantages and novel features of the invention may become apparent from the following detailed description of the invention when considered in conjunction with the drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

Exemplary Computing Environment

Figure 1:
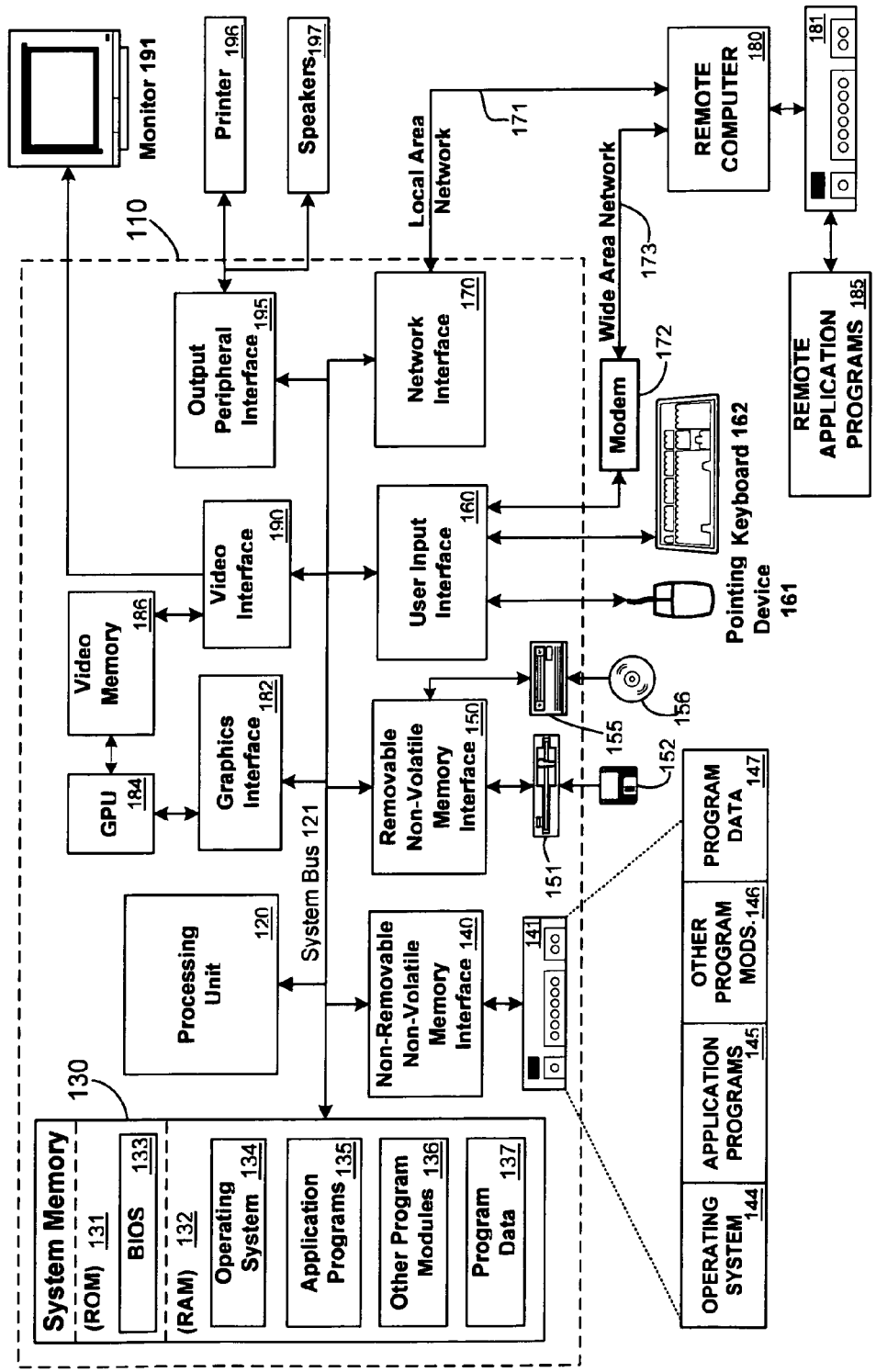
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Execution Failure Investigation Using Static Analysis

In order to provide information to a user regarding a buffer overflow or other overruns in the call stack of a program, static analysis of the code is performed. The code is compiled in such a way that a data value is placed into the thread stack of the program. This data value can later be examined to determine if it has been changed. If it has been changed then this is an indication of a buffer overflow.

The data value placed into the thread stack may be known as a "security cookie," a "cookie", or a "canary." In certain of Microsoft Corporation's compilers (e.g. Visual C++.Net) the insertion of a security cookie can be requested at compile time with the /GS compile switch.

When a security issue has been encountered, static analysis is then used on the modules being run to determine the location of the security issue. For example, where a security cookie has been changed, static analysis is used to identify the likely source of corruption by determining the location of the security cookie in the stack.

Determining the location of the security cookie and deriving meaning from the location of the security cookie is complex. Different versions of the compiler could place the security cookie in different locations on the stack. Additionally, in some compilers, functions that use exception handling place the security cookie in a location different from functions that don't. Optimized functions may place the frame pointer differently and thus change the relative positioning of the security cookie. Some security cookie/canary implementations create a security cookie value for storage on the stack by manipulating some base security cookie data for added security. For example, a security cookie value may be XORed with the return address for the function, and the results of this XOR stored. This makes identifying the security cookie in a crash dump more difficult. Additionally, the frame pointer itself may be corrupted due to the overrun.

Figure 2:
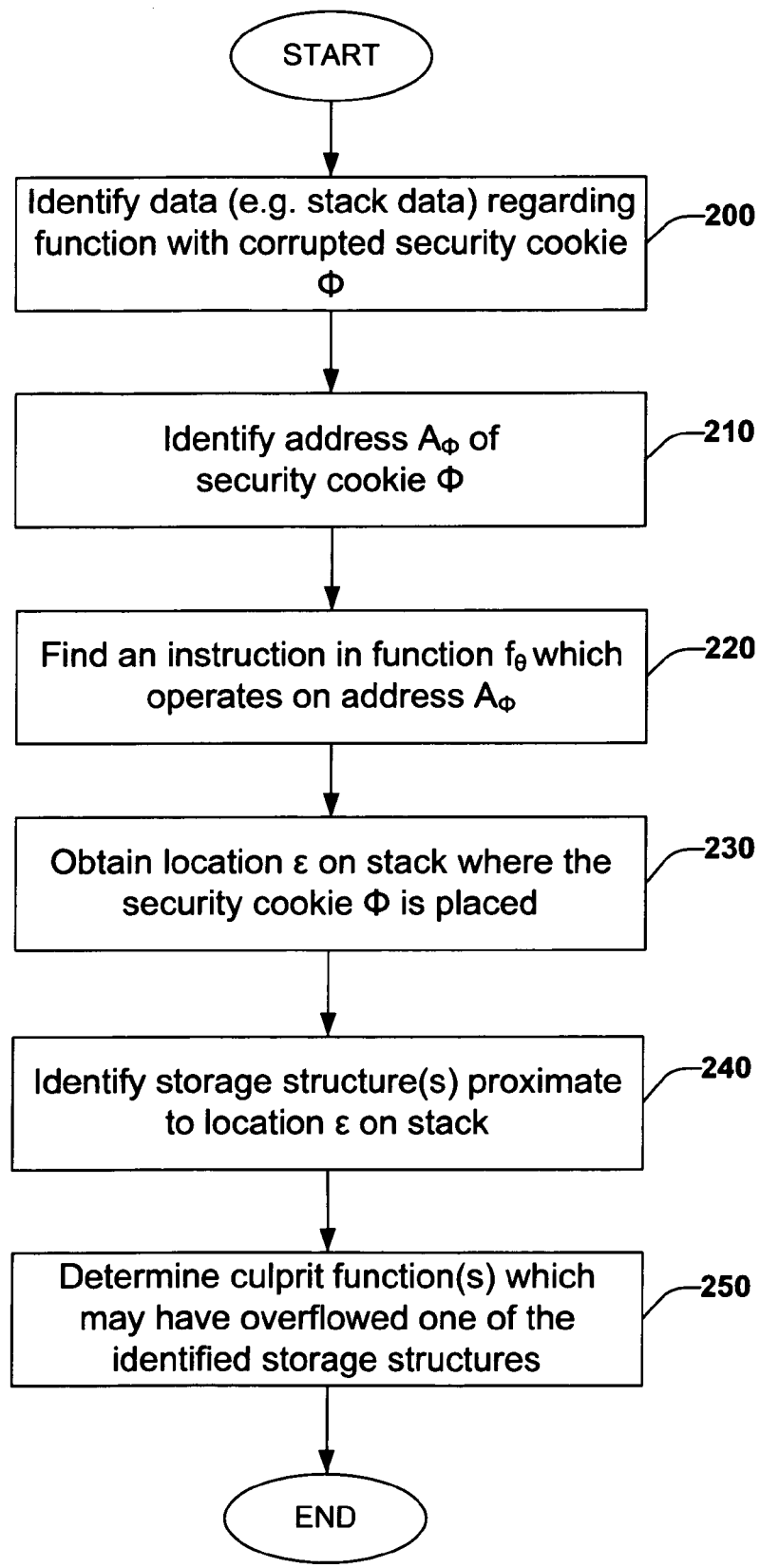
FIG. 2 is a flow diagram of a method for analyzing execution failure according to some embodiments of the invention.

Finding a likely source of a problem when a security cookie has been corrupted is accomplished using static analysis. FIG. 2 is a flow diagram of a method for analyzing execution failure according to one embodiment of the invention. The call stack with the corrupted security cookie ("security cookie $\Phi$") is examined in order to determine which structure is likely to have caused the overrun. In some cases, a crash dump file is obtained using a debugger application program interface (API). The crash dump file can contain more than one call stack. The call stack with the corruption is examined. Thus, data regarding the function $f_\theta$ with the corrupted security cookie $\Phi$ is identified, step 200.

Data regarding the function $f_\theta$ with the corrupted buffer is identified in various ways. In some cases, the data on the call stack regarding a function in which the buffer is corrupted is directly identified by the debugger. In some other cases, the data on the call stack regarding the function in which the buffer is corrupted is identified more indirectly. For example, in some cases, at runtime, a failure-reporting function call (e.g. report_gsfailure) is made when a failure is detected. This function is added by the compiler and executed at runtime. The execution of that failure-reporting function call can be used to determine when the buffer was corrupted. In such cases, the compiler performs a security check call at the time of function return, this call detects the security cookie corruption and reports it, e.g. via a 'report_gsfailure' call. Thus, the function right before the execution of the failure-reporting function (e.g. report_gsfailure) is the function with the corrupted buffer.

This function $f_\theta$ is the function with the corrupted buffer, however, it is not necessarily the function which caused the corruption. Thus, additional steps are used to determine the etiology of the corruption.

When the function $f_\theta$ has been identified, the address $A_\Phi$ of the security cookie $\Phi$ is identified, step 210. The simplest way of identifying $A_\Phi$ is by using symbolic information in the crash dump. However, sometimes the crash dump might not contain this information. In such cases, we find $A_\Phi$ by looking at the non-corrupted part of the stack frame. Fortunately, in some cases the failure-reporting function places the address of the security cookie on its non-corrupted stack frame and we can retrieve $A\Phi$ from there. The security cookie address $A_\Phi$, as described above, does not show the location of the security cookie on the stack frame of $f_\theta$. Once the security cookie address $A_\Phi$ is determined, the location of the cookie on the stack frame of $f_\theta$ is found in steps 220 and 230.

Once the function $f_\theta$ and address $A_\Phi$ have been identified, function $f_\theta$ is analyzed to find an instruction which operates on address $A_\Phi$, step 220. In this way, the instruction which placed the security cookie $\Phi$ in the frame stack. In some embodiments, disassembly is used to disassemble function $f_\theta$ in order to find the relevant instruction. Disassembly is the translation of low-level code (e.g.) machine language to higher-level code (e.g. assembly language.) During disassembly, an instruction with operand address $A_\Phi$ is sought.

In step 230, the location $\epsilon$ on stack where the security cookie $\Phi$ is placed is obtained. In some embodiments, this is done using static analysis. Static analysis (also known as data flow analysis) is a set of techniques which identify the flow of instructions and data in a computer program without executing the program. In static analysis, using a set of static analysis techniques, the program is examined and information about the use of data and storage is collected. Early work on static analysis was done by Frances E. Allen and John Cocke (Allen and Cocke, "A program data flow analysis procedure." Communications of the. ACM, 19(3):137-147, 1976) and further techniques have since been developed to perform static analysis.

In step 240, at least one storage structure proximate to location $\epsilon$ on stack is identified as a possible source of corruption. This step, in some embodiments, is accomplished using static analysis. In some embodiments, all arrays and structures with arrays on the stack are enumerated using symbol information. Then one or more storage structures proximate to the location $\epsilon$ (in which the security cookie $\Phi$ was placed) are identified. For example, the array $\alpha$ or the structure with an array $\beta$ that is closest to location $\epsilon$ on the stack is identified using the symbol information for the function on the stack, and $\alpha$ or $\beta$ is flagged as the possible corruption. Proximity, according to some embodiments, is determined according to a proximity metric. Such a proximity metric is defined in advance, specified during the execution of the method shown in FIG. 2, generated on the fly, or otherwise determined. Proximity need not be direct proximity, for example, in some embodiments both a first storage structure immediately adjacent to location $\epsilon$ and a second storage structure adjacent to the first storage structure may be considered proximate. In some embodiments only storage structures on one side of the location $\epsilon$ are considered proximate. For example, if it can be determined that only structures in higher stack locations could have caused the cookie to be corrupted, than only such structures are considered proximate, even though other structures may be closer in absolute terms to the location $\epsilon$.

In some embodiments, when data structure(s) have been identified as possible sources of corruption, this identification is used by a user directly. However, in some embodiments of the invention, the functions which access the data structure(s) are identified, as shown by step 250.

In step 250, function(s) which access the storage structure(s) identified in step 240 are identified. These functions are the possible culprits for the buffer overflow which caused the cookie to be overwritten. Determining which functions access the storage structure, in one embodiment, occurs via static analysis. A call graph is created for function $f_\theta$. Such a call graph shows the interrelationship of functions. The call graph shows which functions are called by function $f_\theta$, either directly or indirectly, through one or more nested calls to other functions. The call graph is then pruned to eliminate functions which do not take references to any of the storage structure(s) identified in step 240 out as an output parameter. If source code is available, the call graph is further pruned to eliminate function calls that accept references to constant instances of these structures. Static analysis techniques are then used to determine which functions write to these storage structures in a way which would cause the structure to be overrun.

As can be appreciated, in no steps of the embodiments of the invention shown in FIG. 2 is the source code required. Thus, pinpointing a possible cause of failure is performed according to some embodiments of the invention without the use of the source code.

Figure 3:
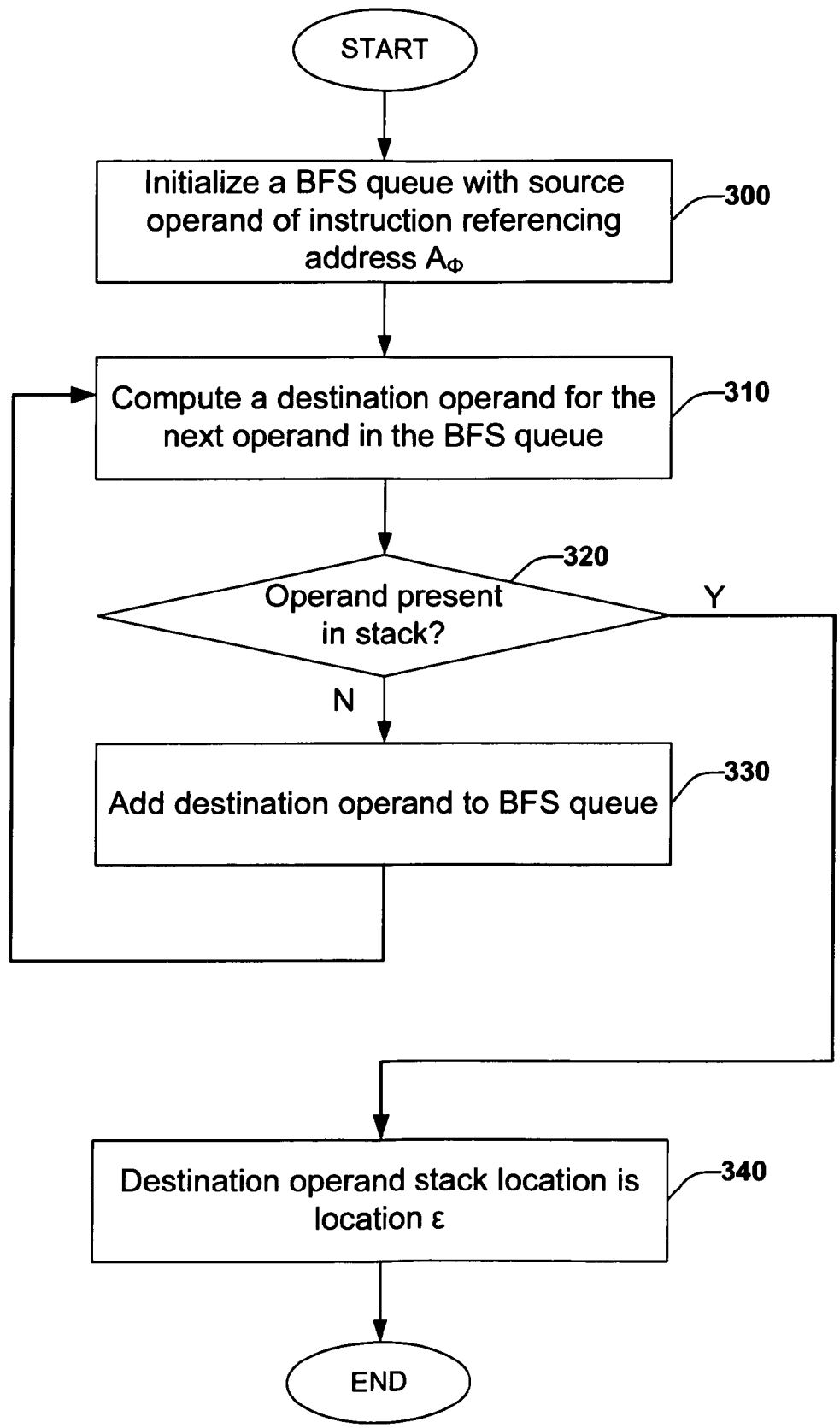
FIG. 3 is a flow diagram providing a method for using static analysis to determine security cookie location according to some embodiments of the invention.

FIG. 3 is a flow diagram providing detail of step 230 according to some embodiments of the invention. FIG. 3 shows one way to use static analysis in determining where the security cookie $\Phi$ was placed on the stack. As shown in FIG. 3, in order to obtain a location $\epsilon$ on the stack where the security cookie $\Phi$ was placed, in step 300 a breadth-first-search (BFS) queue is initialized with the source operand of the instruction obtained in step 220 of FIG. 2. With reference again to FIG. 3, for the next source operand in the BFS queue, a destination operand is computed, as shown in step 310. What happens next depends on whether the destination operand that was computed in step 310 is present in the stack, decision symbol 320. If it is not present in the stack, then the destination operand just computed in step 310 is added to the BFS queue, step 330. The next source operand in the BFS queue is then examined to determine a destination operand, step 310, and the process continues. When a destination operand is encountered which is present in the stack, that destination operand is used to retrieve the stack offset, which describes the stack location $\epsilon$ on the stack where the security cookie $\Phi$ was placed, step 340.

Figure 4:
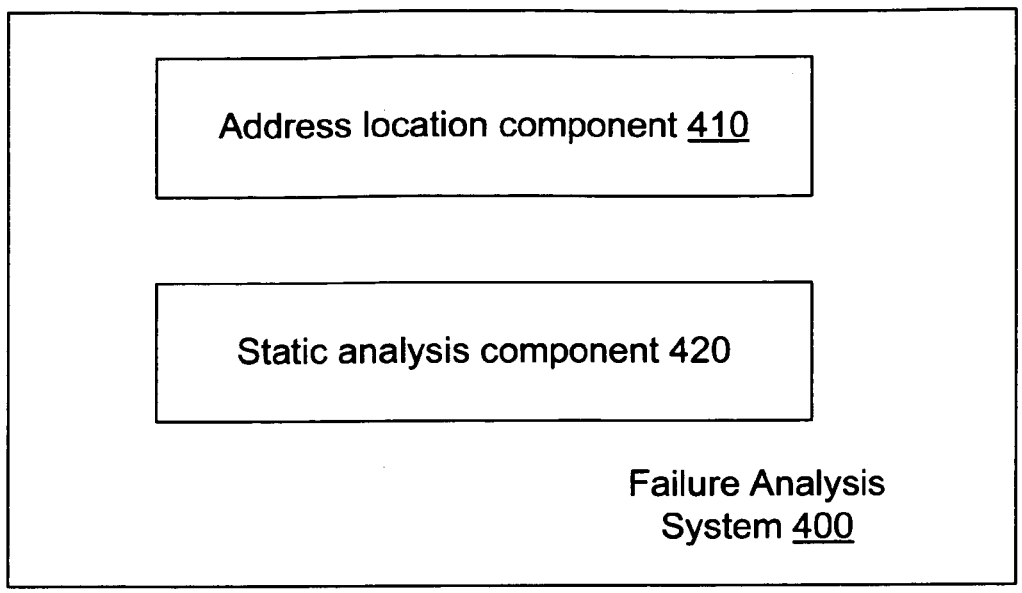
FIG. 4 is a block diagram of a system for analyzing execution failure according to some embodiments of the invention.

FIG. 4 is a block diagram of a system according to some embodiments of the invention. This failure analysis system 400, is included as part of a debugger, provided in addition to a debugger, or used separately. A first component, address location component 410 determines a memory location for an address associated with the failure. For example, such memory location is located in a dump from a debugger, a copy of an execution stack captured during execution. A static analysis component 420 then uses static analysis to determine one or more probable sources in the program for said failure.

Conclusion

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for debugging a software execution failure, said method comprising:

retrieving a static memory address $A_\Phi$ associated with a physical location in system memory where a security cookie is stored, said security cookie having been corrupted during a software execution failure;

identifying an instruction that operated on said static memory address $A_\Phi$;

analyzing said instruction to determine a logical location $\epsilon$ on a call stack of said security cookie;

identifying at least one data structure proximate to said logical location $\epsilon$; and identifying at least one function that operates on at least one data structure from among said at least one data structures proximate to said logical location $\epsilon$ in a manner identified as possibly causing said security cookie to become corrupted, said identifying at least one function comprising;

creating a call graph for a function $f_\theta$ that was operating immediately prior to said software execution failure;

pruning said call graph by eliminating call graph data regarding any functions called by function $f_\theta$ which are not called with one of said at least one data structures as a parameter; and performing static analysis to identify any functions remaining on said call graph that operate on at least one data structure from among said at least one data structures proximate to said logical location $\epsilon$ in a manner identified as possibly causing said secuity cookie to become corrupted.

2. The method of claim 1, where said retreiving a static memory address $A_\Phi$ associated with a physical location in system memory where a security cookie is stored comprises:

examing crash dump data from said software execution failure.

3. The method of claim 2, where said examining crash dump data comprises:

interpreting symbol information from said crash dump data to determine said static memory address $A_\Phi$.

4. The method of claim 1, where said identifying an instruction comprises:

identifying a function $f_\theta$ that was operating immediately prior to said software execution failure;

disassembling said function $f_\theta$; and identifying an instruction that was called by function $f_\theta$ that operated on said static memory address $A_\Phi$.

5. The method of claim 4, where said identifying a function $f_\theta$ comprises;

examining a call stack associated with said software execution failure;

locating a failure reporting function on said call stack; and identifying said function $f_\theta$ by locating said failure reporting function on said call stack.

6. The method of claim 1, vhere said determination of a logical location $\epsilon$ of said security cookie comprises:

performing static analysis on said instruction to determine said logical location $\epsilon$.

7. The method of claim 6, where said performing static analysis comprises:

obtaining call stack data associated with said instruction from crash dump data output for said software execution failure:

initializing a breadth-first-search queue, said breadth-first-search queue storing encountered operands, with a source operand for said instruction;

while no destination operand corresponding to one of said encountered operands corresponds to a logical location in said call stack data, finding a destination operand for one of said encounter operands and adding said destination operand to said breadth-first-search queue; and when a destination operand corresponding to one of said encountered operands corresponds to a logical location in said call stack data, identifying said logical location as logical location $\epsilon$.

8. The method of claim 1, where said identification of at least one data structure proximate to said logical $\epsilon$ comprises obtaining call stack dat associated with said instruction from crash dump data output for said software execution faliure;

using symbol information to identify one or more data structures proximate to logical location $\epsilon$ in said call stack data; and identifying at least one said data structures as said at least one data structures proximate to said logical location $\epsilon$.

9. A computer-readable storage medium having computer-executable instructions for determining a location of a corrupted security cookie on a call stack, given a fuction $f_\theta$ associated with said security cookie, said computer-executable instructions for performing a method comprising;

retrieving a static memory address $A_\Phi$ of said security cookie;

performing static analysis on said function $f_\theta$ to identify a specific instruction which operated on said static memory address $A_\Phi$;

determining a logical location $\epsilon$ on said call stack where said specific instruction operated and where said security cookie was stored;

identifying at least one data structure proximate to said logical location $\epsilon$; and identifying at least one function that operates on at least one data structure from among said at least one data structures proximate to said logical location $\epsilon$ in a manner identifyed as possibly causing said security cookie to become corrupted, said identifying at least one function comprising;

creating a call graph for a function $f_\theta$ that was operating immediately prior to said software execution failure;

pruning said call graph by elimnating call graph data regarding any functions called by function $f_\theta$ which are not called with one of said at least one data structures as a parameter; and performing static analysis to identify any functions remaining on said call graph that operate on at least one data structure from among said at least one data structure proximate to said logical location $\epsilon$ in a manner identified as possibly causing said security cookie to become corrupted.

10. The computer-readable storage medium of claim 9, where said performing static analysis comprises:

Initializing a breadth-first-search queue, said breadth-first-search queue storing encountered operands, with a source operand for said specific instruction while no destination operand corresponding to one of said encountered operands conesponds to a location in said call stack, finding a destination operand for one of said encountered operands and adding said destination operand to said breadth-first-search queue; and when a destination operand corresponding to one of said encountered operands corresponds to a logical location in said call stack, identifying said logical location as logical location $\epsilon$.

* * * * *